Sept. 12, 1967  J. A. FLORKOWSKI  3,341,019
DUAL, ALTERNATELY OPERATING INTERLOCKED LIQUID FILTERS
Filed April 11, 1966  3 Sheets-Sheet 1

INVENTOR
JOHN ANTHONY FLORKOWSKI
BY Adolph G. Martin
ATTORNEY

Sept. 12, 1967  J. A. FLORKOWSKI  3,341,019
DUAL, ALTERNATELY OPERATING INTERLOCKED LIQUID FILTERS
Filed April 11, 1966  3 Sheets-Sheet 2
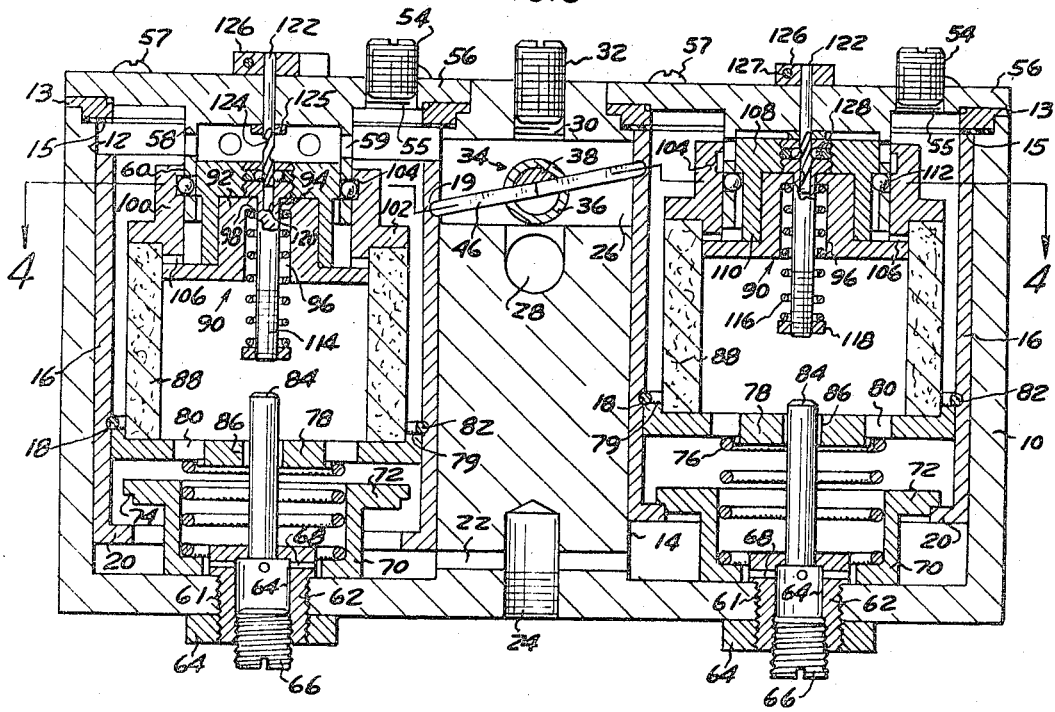
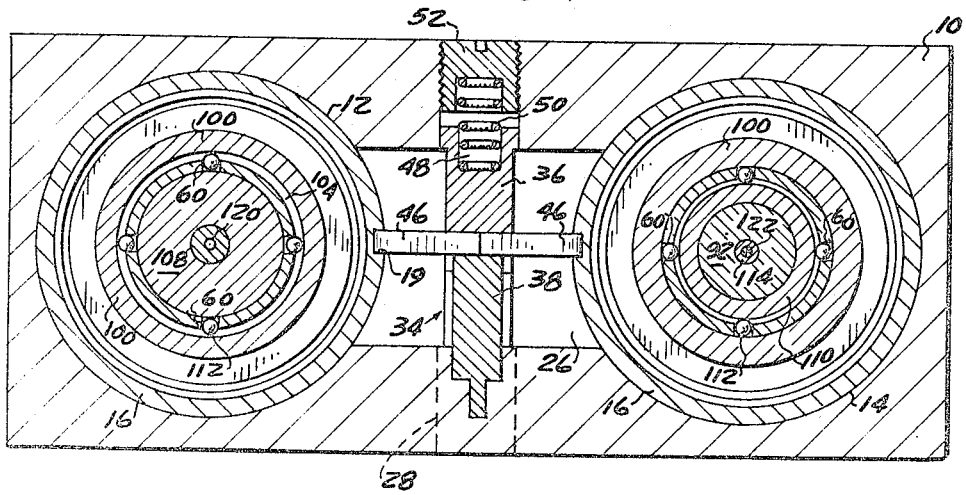
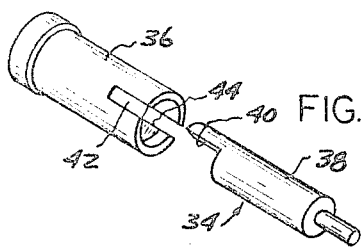
INVENTOR
JOHN ANTHONY FLORKOWSKI
BY Adolph G. Martin
ATTORNEY Sept. 12, 1967     J. A. FLORKOWSKI     3,341,019
DUAL, ALTERNATELY OPERATING INTERLOCKED LIQUID FILTERS
Filed April 11, 1966     3 Sheets-Sheet 3
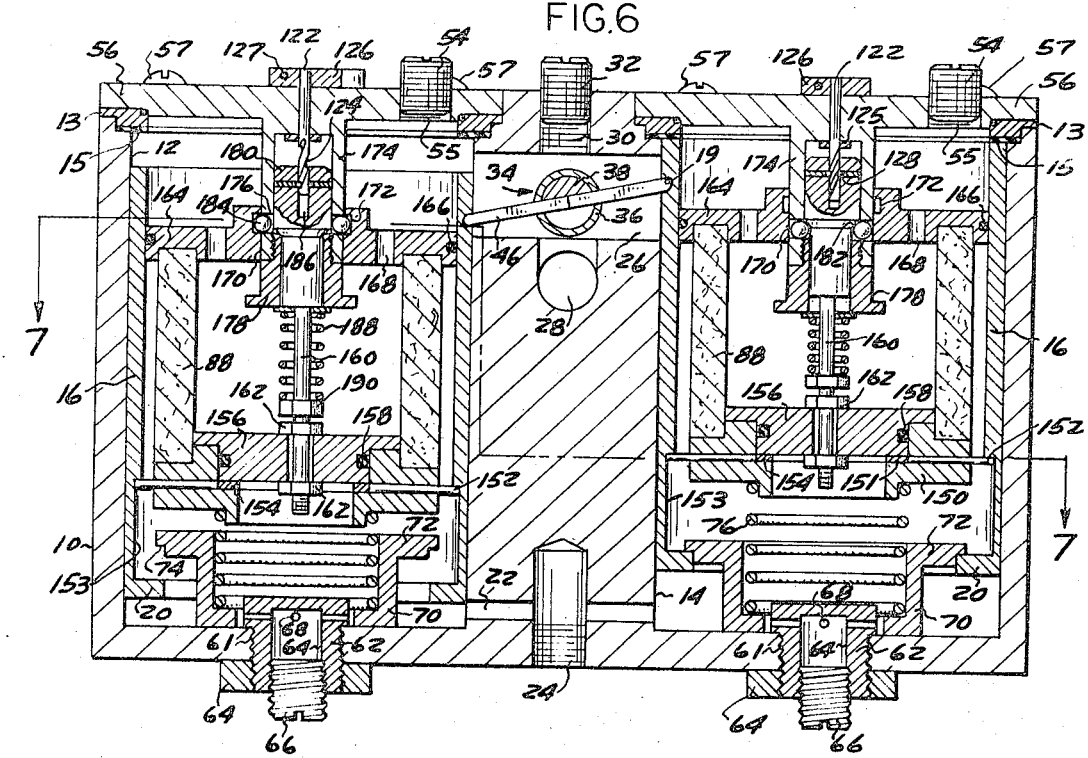
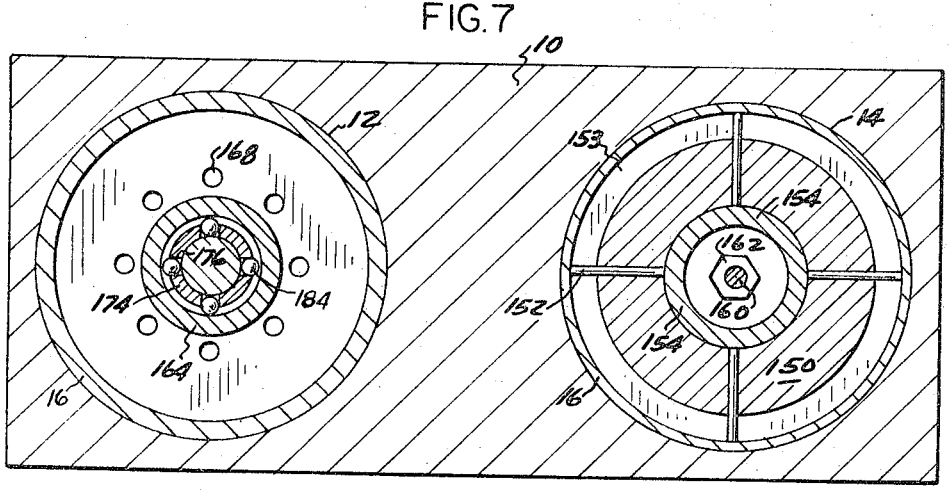
INVENTOR
JOHN ANTHONY FLORKOWSKI
BY *Adolph G. Martin*
ATTORNEY United States Patent Office 3,341,019
Patented Sept. 12, 1967

3,341,019
DUAL, ALTERNATELY OPERATING, INTER-
LOCKED LIQUID FILTERS
John Anthony Florkowski, 8207 Schaefer Road,
Detroit, Mich. 48228
Filed Apr. 11, 1966, Ser. No. 541,640
4 Claims. (Cl. 210—132)

ABSTRACT OF THE DISCLOSURE

A liquid filtering device having a pair of chambers each containing a filter element and a shut-off valve which closes automatically when the filter element becomes partially clogged thereby producing a pressure differential across the filter element in excess of a pre-selected magnitude. An interlock between the two shut-off valves places the chambers in operation alternately so that a partially clogged filter element may be cleaned without the necessity of interrupting fluid flow through the device.

This invention relates to liquid filters generally, and more particularly to a dual type of liquid filter automatically responsive to preselected pressure differentials across the filtering element, as disclosed in my co-pending application Ser. No. 471,381, filed July 12, 1965 of which this is a continuation in part.

Liquid filters, of the type commonly used in industrial hydraulic systems, seldom make adequate provision for continuity of service while the filtering element is being changed or cleaned. Most such filters further fail to maintain proper working pressures in the system when flow through the filter is restricted due to an accumulation of foreign materials on the filtering element.

Aware of these shortcomings, the applicant has, as the primary object of his invention, the provision of a dual type liquid filter which automatically introduces a clean filtering element into the hydraulic circuit when the pressure differential across the element reaches a preselected magnitude.

Another object of the invention is to provide a filter of the type previously described, in which pressurized fluid can be forced through the inactive portion of the filter in a reverse direction, so as to flush the filtering element free of impurities without the necessity of removing the element from the filter.

A further object of the invention is to provide a filter, of the type previously described, in which impurities flushed from the filtering elements may be conveniently removed from the system and prevented from returning to the supply tank to further contaminate the working fluid.

Other features and advantages of the invention will become apparent after consideration of a detailed discussion of the same composed with reference to the drawings constituting a portion of this application, and in which:

FIGURE 3 is a section view, taken substantially on plane 3—3 in FIGURE 2, showing internal structural details of the filter.

FIGURE 4 is a section view, taken substantially on plane 4—4 in FIGURE 3, showing the pivotal interlock between the two sleeve pistons.

FIGURE 5 is an exploded perspective view showing the coupling connecting the trip rods.

FIGURE 6 is a section view, similar to FIGURE 3, showing a modification of the applicant's invention.

FIGURE 7 is a section view, taken substantially on plane 7—7 in FIGURE 6, showing internal structural details of the modification.

Figure 1:
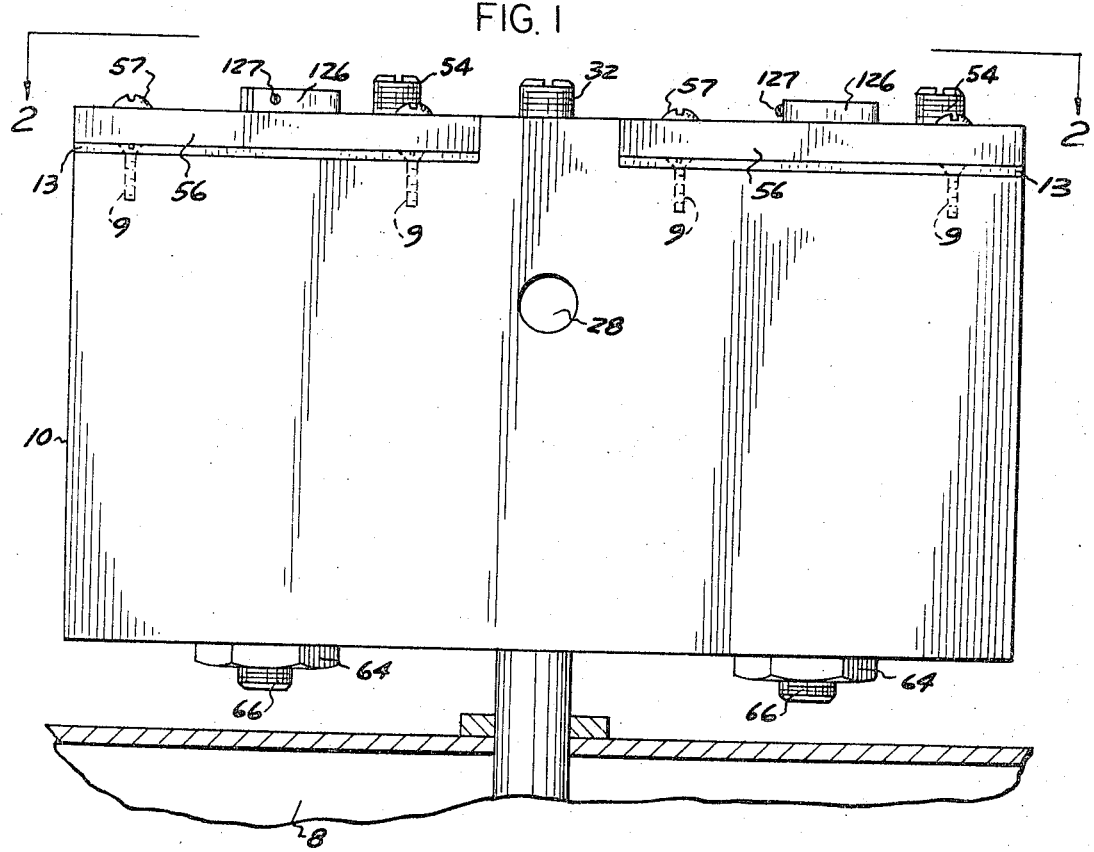
FIGURE 1 is a side elevation view of the applicant's filter showing its characteristic shape and mounted position on a hydraulic tank.
Figure 2:
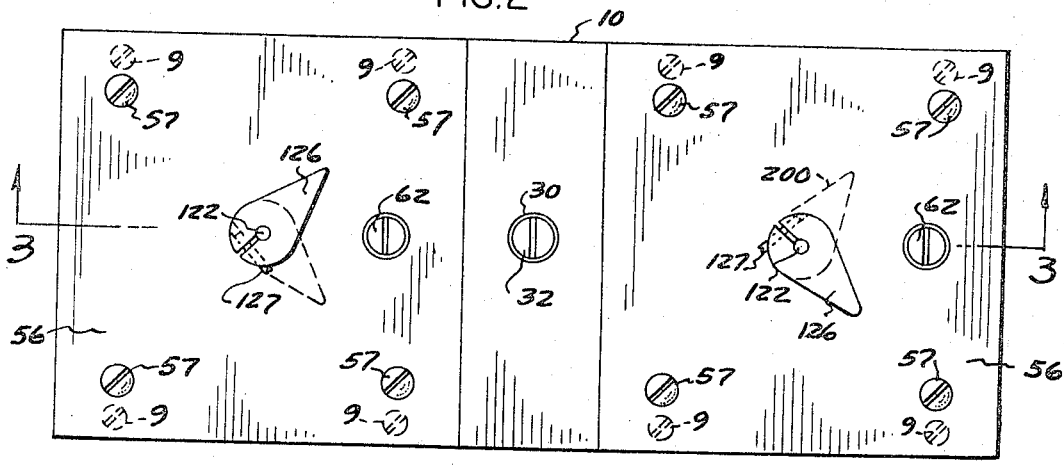
FIGURE 2 is a top plan view, taken substantially on plane 2—2 in FIGURE 1, showing the removable cover plates and the visual indicators.

For a more detailed description of the invention, reference is made to the drawings in which numeral 10 designates a housing having therein a pair of vertically disposed parallel cylinders 12 and 14, as shown in FIGURES 3 and 6. A flanged insert 13, at the upper end of the cylinders 12 and 14, provides a laterally disposed annular seat 15. A series of countersunk screws 9, as shown in FIGURES 1 and 2, attach the flanged insert 13 to the housing 10.

A sleeve piston 16, in each of the cylinders 12 and 14, has a circular groove 18 on the inner periphery, and a small slot 19 on the outer surface adjacent the upper edge. An inwardly disposed flange 20 is provided around the lower end of each sleeve piston 16. A flat transverse duct 22, in the lower portion of the housing 10, connects the two cylinders 12 and 14, and communicates with a threaded intake port 24.

A flat transverse duct 26, in the upper portion of the housing 10, communicates with both cylinders 12 and 14, and connects to a threaded discharge port 28. An access opening 30, in the upper face of the housing 10, communicates with the flat transverse duct 26, and is sealed by a removable closure plug 32. A coupling 34, in the flat transverse duct 26 of the housing 10 comprises a sleeve 36, and an elongated plug 38.

The plug 38 is pivotally supported in the housing and has on the inner end a laterally disposed flat surface 40. The sleeve 36, also pivotally supported in the housing 10 has therethrough a diametral slot 42, and an internal flat surface 44 which provides, in conjunction with the flat surface 40 on the plug 38, a pair of spaced seats. Two aligned trip bars 46, have their abutting ends seated on the flat surfaces 40 and 44, and their outer ends engaged in the small slots 19 in the sleeve pistons 16.

The sleeve 36 has an axial opening 48 in the outer end, containing a coil spring 50 compressively held therein by a retainer plug 52 threaded into the housing 10. A self sealing cover plate 56, on each of the two cylinders 12 and 14, is removably attached to the housing 10 by screws 57, and has therein a threaded opening 55 sealed by a plug 54. A dependent cylinder 58 on each of the cover plates 56, has therein a series of radial openings 59 adjacent the upper end, and four spaced openings 60 near the lower end.

Each of the cylinders 12 and 14 has a central drain opening 61 in the bottom fitted with a closure insert 62 secured in the housing 10 by a nut 64. The closure insert 62 contains a longitudinal chamber 64, having a downwardly disposed threaded opening containing a removable plug 66. A series of radial ducts 68, in the closure insert 62, provides communication between the longitudinal chamber 64 and the interior of its associated cylinder.

A retainer cup 70, seated in the bottom of each of the cylinders 12 and 14, has a lateral rim 72 providing a downwardly disposed annular seat 74. A coil spring 76 in each retainer cup 70 provides an upward thrust to be utilized for shifting the sleeve pistons 16. A disc 78, having an upstanding rim 79 and a series of circular openings 80 therein, is supported on the coil spring 76, as shown in FIGURE 3.

A resilient ring 82 is inserted into the circular groove 18 in the sleeve pistons 16, to position the disc 78 and hold the coil spring 76 compressed. An upright guide rod 84, on the closure insert 62, extends through an axial opening 86 in the disc 78. A filter cartridge 88 is seated on the disc 78 in each of the sleeve pistons 16 inside the upstanding rim 79. A cap 90, on the filter cartridges 88, has a central hub 92 with an axial opening 94 therethrough having an enlarged portion 96 providing a seating shoulder 98.

An upright sleeve 100 on the cap 90, is slidable on the dependent cylinder 58, and has a lateral flange 102 resting on the filter cartridge 88. The sleeve 100 contains an internal annular groove 104 adjacent the upper end, and a series of radial vent ports 106 therethrough around the lower end. An invented cup piston 108, slidably positioned in the dependent cylinder 58, has a skirt 110 therearound of reduced diameter.

Balls 112 are slidably held in the four spaced openings 60 in the lower end of the two dependent cylinders 58. A threaded rod 114 depends from each of the cup pistons 108, and extends through the axial opening 94 in the cap 90. A coil spring 116, around the lower end of the threaded rods 114, is adjustably held thereon by a retainer nut 118. The threaded rods 114 have an axially disposed socket 120 in the upper end containing pivotal pins 122 with spiral grooves 124 in the lower portion.

The pivotal pins 122 extend through the cover plates 56, and have, adjacent the lower side thereof, a fixed collar 125. An indicator 126 is removably attached on the upper end of the pivotal pins 122 by means of screws 127. Two oppositely disposed balls 128 are rollably mounted in the inverted cup piston 108, so as to project slightly into the socket 120 in the threaded rod 114 and engage the spiral grooves 124 in the pivotal pins 122.

The modification of the applicant's invention shown in FIGURES 6 and 7 utilizes the same basic principal of operation employed by the filter in FIGURES 1 through 5; however, the internal construction differs materially. In this latter embodiment, a circular housing 150, having an axial opening therethrough providing an internal shoulder 151, is supported in each of the sleeve pistons 16 by the coil springs 76.

Four slidable locking pins 152, projecting outwardly from the circular housing 150, and extend into an enlarged section 153 in the sleeve piston 16. A removable retainer ring 154, supported on the internal shoulder 151 in the circular housing 150, holds the locking pins 152 in their extended position. A closure plate 156, inside the filter cartridge 88, has a resilient ring 158 therearound which seals the axial opening through the circular housing 150. An upstanding threaded rod 160 is axially supported in the closure plates 156 by nuts 162.

A cap 164, on each of the filter cartridges 88, has a resilient ring 166 therearound in sealing engagement with the inner periphery of its associated sleeve piston 16. The cap 164 contains a circular array of openings 168 therein, and an axial bore 170 providing an annular groove 172 adjacent the upper edge. A small cylinder 174 depends from the lower side of each cover plate 56, and extends through the axial bore 170 in the cap 164.

The small cylinder 174 has four spaced radial openings 176 therein, and an internal threaded section adjacent the lower end. A guide ferrule 178 is threaded into the lower end of each small cylinder 174. An actuator piston 180, on the upper end of the threaded rods 160, is slidably contained in the small cylinder 174. A downwardly disposed annular beveled shoulder 182 is provided on the actuator piston 180.

Balls 184 are slidably positioned in the four spaced radial openings 176 in the small cylinder 174. The actuator pistons 180 each have an axially disposed socket 186 in the upper end containing pivotal pins 122 with spiral grooves 124 on the lower portion. The pivotal pins 122 extend through the cover plates 56, and have thereon a fixed collar 126 in bearing engagement with the lower side of the cover plate 56.

Two oppositely disposed balls 128 are rollably mounted in the actuator piston 180 so as to project slightly into the socket 186, and engage the spiral grooves 124 in the pivotal pins 122. An indicator 126 is removably attached on the upper end of the pivotal pins 122 by means of screws 127. A coil spring 188 on the threaded rod 160, is seated on the guide ferrule 178, and adjustably retained thereon by a nut 190.

The preceding discussion completes a description of the structural details of the applicant's invention as herein disclosed; however, to insure a more thorough appreciation and understanding of the subject matter herein presented, a brief discussion will be directed to the manner in which the applicant's filter operates in performing its intended function, so as to make possible the realization of all objectives set forth in the introduction of this specification.

In use, the applicant's dual filter is mounted on a hydraulic tank 8, as illustrated in FIGURE 1, with the cylinders 12 and 14 disposed in a substantially vertical position. The discharge port 28 is then connected to the intake port of the pump in the hydraulic system being serviced by the filter. With the applicant's dual filter in the position shown in FIGURE 3, the left cylinder 12 is in the open or operating position.

The sleeve 16 in cylinder 12 is thus fully retracted, and the sleeve piston 16 in cylinder 14 is an extreme forward position engaging the annular seat 15 on the flanged insert 13. Communication is thus disrupted between the flat transverse duct 26 and the cylinder 14. With the sleeve piston 16 in cylinder 14 elevated, the flange 20 thereon engages the annular seat 74 on the retainer cup 70 thereby preventing communication between cylinder 14 and the flat transverse duct 22.

The indicators 126, associated with each of the cylinders 12 and 14, accordingly assume the full line positions shown in FIGURES 1 and 2. When cylinder 14 has thus been sealed from the hydraulic system, the plugs 54 and 66 are removed from the cover plate and closure insert 56 and 62 respectively. Pressurized hydraulic liquid may then be directed into the opening 55 of the closure plate 56, and through the filter cartridge 88 in a reverse direction.

This counter flow of liquid dislodges the solid contaminants from the inner surface of the filter cartridge 88, and carries it down through the circular openings 80 in the disc 78. From here it passes through the radial ducts 68 in the closure insert 62, and into the chamber 64 where it is drained from the housing 10 in any suitable manner. When the filter cartridge 88 has thus been fully cleaned, the plug 66 is returned to the closure insert 62 to seal the drain opening.

A suitable implement, such as a screw driver, is then inserted into the opening 55 in the cover plate 56, and placed in contact with the lateral flange 102 on the sleeve 100. A downward force is applied to the screw driver thereby moving the filter cartridge 88 downward in the cylinder 14, and compressing the coil spring 76. When the annular groove 104 in the sleeve 100 is laterally aligned with the balls 112, the pull on the rod 114, exerted by the coil spring 116, causes the inverted cup piston 108 to shift downward.

This movement of the cup piston 108 forces the balls 112 into the annular groove 104 thereby locking the filter cartridge 88 in a lowered position in the cylinder 14. The plug 54 is then returned to the opening 55 in the cover plate 56 to re-seal the cylinder 14. Such downward movement of the inverted cup piston 108 also shifts the associated indicator 126 to the broken line position 200 in FIGURE 2, showing that the filter cartridge 88 in cylinder 14 has been cleaned, reset and ready for continued operation.

While the filter cartridge 88 in cylinder 14 is thus being cleaned and reset, fluid is being supplied to the hydraulic system through cylinder 12. Such fluid is drawn from the tank 8 through the intake port 24, and into the flat transverse duct 22. From here it passes into the cylinder 12, upward around the retainer cup 70, and through the circular openings 80 in the disc 78. It is then drawn through the filter cartridge 88, over the top of the sleeve piston 16 and into the flat transverse duct 26.

It next enters the discharge port 28, and flows to the pump which forces it under pressure through the system for use in operating hydraulic equipment and machinery. The fluid is then returned to the tank 8 for re-circulation through the filter cartridge 88 which removes the solid contaminants. When the filter cartridge 88 has become loaded with impurities, the free flow of hydraulic liquid therethrough is impeded materially.

This diminution in flow produces a substantial pressure differential between the inner and outer surfaces on the filter cartridge 88. The reduction of pressure on the outer surface of the filter cartridge 88 is transmitted to the upper face of the inverted cup piston 108 through the radial openings 59 in the dependent cylinder 58. When this reduced pressure reaches a pre-selected magnitude, the cup piston 108 will move upward a distance sufficient to align laterally the piston skirt 116 with the balls 112.

The continuous upward thrust exerted by the compressed coil spring 76 will then force the balls 112 inwardly, thereby allowing the filter cartridge assembly to shift upward and carry the sleeve piston 16 to its elevated or closed position in cylinder 12. In this position, the upper edge of the sleeve piston 16 enters into a sealing engagement with the annular seat 15 on the flanged insert 13. As the sleeve piston 16 in cylinder 12 moves upward, the trip rod 46 engaged therein causes the coupling 34 to pivot, thereby shifting the sleeve piston 16 in cylinder 14 to its fully retracted or open position.

The flow of hydraulic fluid is thus automatically re-directed through the right cylinder 14, which contains the clean filter cartridge 88, that was previously flushed and reset as heretofore described. When in the course of operation, the filter cartridge 88 in cylinder 14 again becomes sufficiently loaded with impurities, flow will be automatically re-directed through cylinder 12 in the manner previously described, thus providing an interrupted supply of filtered fluid to the hydraulic system.

The embodiment of FIGURES 6 and 7 shows the sleeve piston 16 in cylinder 12 in an open or retracted position, and the sleeve piston 16 in cylinder 14 in an extreme forward or closed position. With the cylinders 16 in this relative position, fluid is drawn from the tank 8 through the intake port 24, and into the flat transverse duct 22. From here it passes into the cylinder 12 and upward around the four locking pins 152.

The fluid is then drawn through the filter cartridge 88, into the circular openings 168 in the cap 164, over the top of the sleeve piston 16, and into the flat transverse duct 26. It next enters the discharge port 28, and flows to the pump, which forces it under pressure through the hydraulic system. The fluid is then returned to the tank 8 for re-circulation through the filter cartridge 88 as previously explained.

When the filter cartridge 88 has become loaded with impurities, a substantial pressure differential appears between the inner and outer surfaces. This reduction of pressure on the inner surface of the filter cartridge 88 is also impressed on the upper surface of the closure plate 156. When this reduced pressure reaches a pre-selected magnitude, the closure plate 156 moves upward a distance sufficient to elevate the actuator piston 180 so that the beveled shoulder 182 thereon assumes a lateral position above the balls 184.

The continuous upward thrust, exerted by the compressed coil spring 76 will then force the balls 184 inwardly thereby allowing the filter cartridge assembly to shift upward and carry the sleeve piston 16 to its elevated or closed position in cylinder 12. As the sleeve piston 16 in cylinder 12 moves upward, the trip rod 46 engaged therein causes the coupling 34 to pivot so as to shift the sleeve piston 16 in cylinder 14 to its fully retracted or open position.

Since the cleaning and resetting operation for the filter assembly is identical to that previously described for the embodiment of FIGURES 1 through 4, it will not be repeated. In practice, the tension of control springs 116 and 188 respectively in the two embodiments, may be adjusted to select the pressure on the down stream side of the filter cartridge 88 at which each will allow the filter assembly to shift upward, and move the associated sleeve 16 to a closed position in the cylinder.

Based upon the foregoing discussion, the applicant is of the opinion that his intention has fulfilled a long-felt need in the field of liquid filters, and that he has accordingly made a valuable contribution to the related art. However, while the invention was described with reference to the structural details of a limited number of embodiments, it will be appreciated by those skilled in the art, that the principles involved are susceptible of numerous other practical adaptations.

Therefore, I claim as new and desire to secure by Letters Patent:

1. A liquid filter comprising a housing having therein two cylinders and an intake port and a discharge port communicating with each cylinder, a sleeve piston in each of the cylinders having an advanced and a retracted position, such sleeve pistons preventing communication with the discharge port when in an advanced position and permitting such communication when in a retracted position, means interlocking the two sleeve pistons so that when one is in an advanced position the other is in a retracted position, a filter cartridge in each sleeve piston having therein a raised and a lowered position, such filter cartridge further having an inner and outer face thereon and a top and a bottom opening, a small cylinder adjacent the upper end of each sleeve piston, a cap over the top opening in the filter cartridge having a sleeve slidable on the small cylinder, locking members slidably carried by the small cylinder, a piston in the small cylinder for moving the locking members into holding engagement with the sleeve, means providing communication between the outer face of the filter cartridge and the upper surface on the small piston when the filter cartridge is in a lowered position, an axial rod fixed in the piston and projecting downward through the cap, an adjustable resilient member on the axial rod urging the piston downward so as yieldably to hold the locking members in engagement with the sleeves when the filter cartridge is in the lowered position, a closure disc over the bottom opening in the filter cartridge slidable in the sleeve piston, and having therein a plurality of openings, a spring in each cylinder yieldably urging the filter cartridge and the members thereon to a raised position, and means in the sleeve pistons for operatively engaging the upper side of the closure disc.

2. The filter of claim 1 having in addition thereto: a drain means in the bottom of each cylinder, a cup around the drain means, and a lateral member on the cup adapted to enter into a sealing engagement with the sleeve piston when the latter is in an advanced position in the cylinder so as to prevent communication between the intake port and the drain means.

3. A liquid filter comprising a housing therein two cylinders and an intake port and a discharge port communicating with each cylinder, a sleeve piston in each of the cylinders having an advanced and a retracted position, such sleeve pistons preventing communication with the discharge port when in an advanced position and permitting such communication when in a retracted position, means interlocking the two sleeve pistons so that when one is an advanced position the other is in a retracted position, a filter cartridge in each sleeve piston having therein a raised and a lowered position, such filter cartridge having an inner and outer face thereon and a top and a bottom opening, a small cylinder adjacent the upper end of each sleeve piston, a cap over the top opening in the filter cartridge slidable on the small cylinder, such cap having therein a plurality of openings, locking members slidably carried by the small cylinder, a piston in the small cylinder for moving the locking members into holding engagement with the cap, a housing over the lower end of the cartridge having therethrough a central opening, a closure plate for the central opening, a rod connecting the piston and the closure plate, an adjustable resilient member on the rod urging the piston downward so as yieldably to hold the locking members in engagement with the cap when the filter cartridge is in a lowered position, a spring in each cylinder yieldably urging the filter cartridge and the members thereon to a raised position, and outwardly projecting pins in the housing on the filter cartridge for operatively engaging the sleeve piston.

4. The filter of claim 3 having in addition thereto: a drain means in the bottom of each cylinder, a cup around the drain means, and a lateral member on the cup adapted to enter into a sealing engagement with the sleeve piston when the latter is in an advanced position in the cylinder so as to prevent communication between the intake port and the drain means.

References Cited

UNITED STATES PATENTS

| | | | |
|---|---|---|---|
| 1,171,611 | 2/1916 | Hauer | 210—390 |
| 1,189,566 | 7/1916 | Hauer | 210—340 X |
| 3,077,989 | 2/1963 | Larkin | 210—340 X |

REUBEN FRIEDMAN, *Primary Examiner.*

F. SPEAR, *Assistant Examiner.*